United States Patent [19]
Umetsu

[11] Patent Number: 5,098,071
[45] Date of Patent: Mar. 24, 1992

[54] DIE SPRING APPARATUS

[75] Inventor: Chiharu Umetsu, Yokohama, Japan

[73] Assignee: NHK Spring Co., Ltd., Yokohama, Japan

[21] Appl. No.: 570,501

[22] Filed: Aug. 21, 1990

[30] Foreign Application Priority Data

Aug. 30, 1989 [JP] Japan ................................ 1-223713

[51] Int. Cl.⁵ .............................................. F16F 9/04
[52] U.S. Cl. ................................ 267/64.27; 92/166;
92/167; 188/322.17; 267/119; 267/122;
267/130; 277/30; 277/58; 277/165; 384/16;
384/38
[58] Field of Search ............... 267/64.19, 64.23, 64.27,
267/119, 122, 130; 277/30, 58, 97, 165; 304/16,
37, 38; 92/44, 165 R, 166, 167, 168 R; 120/259

[56] References Cited

U.S. PATENT DOCUMENTS

| | | | |
|---|---|---|---|
| 3,180,634 | 4/1965 | Heiser | 267/119 |
| 3,202,411 | 8/1965 | Heiser | 267/119 |
| 3,346,272 | 10/1967 | Smith | |
| 3,366,425 | 1/1968 | Genz | 188/322.17 X |
| 3,387,856 | 6/1968 | Guilhamat et al. | |
| 3,549,154 | 12/1970 | Jones | 92/168 |
| 4,583,722 | 4/1986 | Wallis | 267/130 X |
| 4,664,362 | 5/1987 | Hennells | 267/119 |
| 4,709,932 | 12/1987 | Edlund et al. | 277/165 |
| 4,921,227 | 5/1990 | Fukumura et al. | 267/64.27 X |

FOREIGN PATENT DOCUMENTS

| | | | |
|---|---|---|---|
| 229902 | 7/1987 | European Pat. Off. | |
| 2579282 | 9/1986 | France | 188/322.17 |
| 62-13243 | 1/1987 | Japan | |
| 667141 | 9/1988 | Switzerland | 92/168 |
| 2108218 | 5/1983 | United Kingdom | 188/322.17 |
| 2219050 | 11/1989 | United Kingdom | 277/58 |

Primary Examiner—George E. A. Halvosa
Attorney, Agent, or Firm—Frishauf, Holtz Goodman & Woodward

[57] ABSTRACT

A compressed gas and a liquid are contained in a cylinder. A liquid chamber containing the liquid and a gas chamber containing the gas are divided by a metallic bellows. The liquid chamber is situated on the side of an open end of the cylinder. A rod is inserted in the cylinder. A sealing assembly is provided at the open end of the cylinder. The sealing assembly has a bearing member at only one portion of the cylinder with respect to the axial direction thereof. A space extends throughout the circumference between the outer peripheral surface of the inner end of the rod and the inner peripheral surface of the cylinder. A seal device for sealing the liquid in the liquid chamber includes a seal ring intimately in contact with the outer peripheral surface of the rod and an elastomer ring provided on the outer peripheral surface side of the seal ring and capable of elastic deformation in the radial direction of the rod. The rod can swing within the range of an angle θ to the axis of the cylinder around the bearing member. The elastomer ring is deformed as the rod swings.

4 Claims, 7 Drawing Sheets 5,098,071

DIE SPRING APPARATUS

BACKGROUND OF THE INVENTION

1. Field of the Invention

The present invention relates to a die spring apparatus charged with compressed gas and adapted to be used in press equipment and the like.

2. Description of the Related Art

In stamping or drawing a blank by means of press equipment, a pressure pad is used to prevent the blank from wrinkling. The pad is urged by means of a die spring. The inventors hereof have been developing die spring apparatuses of a gas-spring type to be used in place of the conventional coil springs or urethane springs.

A conventional die spring apparatus 100 shown in FIG. 12 comprises a gas chamber 102 defined in a cylinder 101 and a rod 103 inserted in the cylinder 101. A proximal portion 105 of the cylinder 101 is supported by means of a first bearing portion 106. An outer end 107 of the rod 103 is in contact with a second bearing portion 108. The pressure of a compressed gas sealed in the gas chamber 102 acts in a direction to force out the rod 103 from the cylinder 101.

A first bearing 110 is provided at an open end of the cylinder 101. The bearing 110 is in contact with the outer peripheral surface of the rod 103. A piston 111 with a second bearing 112 thereon is disposed at the inner end of the rod 103. The bearing 112 is in contact with the inner peripheral surface of the cylinder 101. The bearings 110 and 112 allow the rod 103 to move in the axial direction, but prevent it from moving in the radial direction. Thus, the angle at which the rod 103 can swing with respect to the axis X0 of the cylinder 101 is about 0.015° at the most.

A study made by the inventors hereof indicated that the die spring apparatus 100 constructed in this manner has the following problems.

Depending on the mounting state of the die spring apparatus 100, the axis X0 of the apparatus 100 sometimes may be tilted at an angle 81 to the bearing portion 108. In FIG. 12, the angle 81 is exaggerated for ease of illustration. If the apparatus 100 is tilted in this manner, a point 115 of contact between the rod 108 and the bearing portion 108 on the movable side shifts sideways for a distance ΔP when the bearing portion 108 lowers for a stroke S with respect to the bearing portion 106 on the fixed side at the time of pressing operation.

Thus, a frictional force is produced between the rod 103 and the bearing portion 108, and a load F acts in the radial direction of the rod 103. In this case, a radial load R1 is produced in the first bearing 110, due to a moment corresponding to a distance L1 from the second bearing 112. If the distance from the first bearing 110 to the outer end 107 of the rod 103 is L2, R1 is given by $$R1 = \{(L1+L2) \cdot F\}/L1.$$

Also, a radial load R2 is produced in the second bearing 112, due to a moment corresponding to the distance L1 from the first bearing 110. R2 is given by $$R2 = (L2 \cdot F)/L1.$$

Accordingly, the bearings 110 and 112 must be strong enough to stand the loads R1 and R2. At the time of pressing operation, however, the die spring apparatus 100 is subjected to a very great axial load. If the load on the rod 103 is 1,000 kgf, and if the coefficient of friction between the contact point 115 of the rod 103 and the bearing portion 108 is 0.2, for example, the load F is as great as 200 kgf. Accordingly, the loads R1 and R2 are also great, so that the bearings 110 and 112 are liable to be damaged. Further, the contact portion between the contact point 115 of the rod 103 and the bearing portion 108 wears, resulting in lowering of the durability of the apparatus.

SUMMARY OF THE INVENTION

The object of the present invention is to provide a die spring apparatus with satisfactory durability.

A die spring apparatus according to the present invention, developed in order to achieve the above object, comprises:

a cylinder having an open end and a closed end;

partitioning means housed in the cylinder and defining a liquid chamber situated on the side of the open end and a gas chamber situated on the side of the closed end;

a liquid contained in the liquid chamber; a compressed gas with which the gas chamber is charged;

a rod inserted into the cylinder through the open end thereof so as to be movable relatively to the cylinder in the axial direction, the rod having an inner end situated in the cylinder and an outer end situated outside the cylinder so that a space extends throughout the circumference between the outer peripheral surface of the inner end and the inner peripheral surface of the cylinder; and a sealing assembly provided at the open end of the cylinder and having a rod hole through which the rod is passed, the sealing assembly including:

(a) a seal housing located at the open end of the cylinder and having an inner peripheral portion facing the outer peripheral surface of the rod, the inner peripheral portion having a annular groove continuous throughout the circumference thereof;

(b) a bearing member provided at only one portion of the sealing assembly with respect to the axial direction thereof, the inner peripheral surface of the bearing member being in contact with the outer peripheral surface of the rod so that the bearing member restrains radial motion of the rod, the bearing member supporting the rod so that the rod is swingable with respect to the axis of the cylinder; and (c) a seal device for sealing the liquid in the liquid chamber, the seal device being housed in the annular groove of the seal housing so that the inner peripheral surface of the seal device being intimately in sliding contact with the outer peripheral surface of the rod, the seal device being elastically deformable in the radial direction of the rod.

If the die spring apparatus of the present invention is tilted for any reason when it is attached to a bearing portion, the rod can swing around the bearing member at the time of pressing operation. Accordingly, no excessive frictional drag can be produced between the outer end of the rod and the bearing portion. Thus, the radial load acting on the bearing member is small. The sealing assembly used in the present invention can securely seal the liquid in the liquid chamber. Since the compressed gas in the gas chamber is confined between the liquid in the liquid chamber and the closed end of the cylinder, it cannot leak out through the sealing assembly. This leads to improvement of the durability of the die spring apparatus.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Referring now to FIGS. 1 to 6, a first embodiment of the present invention will be described.

Figure 1:
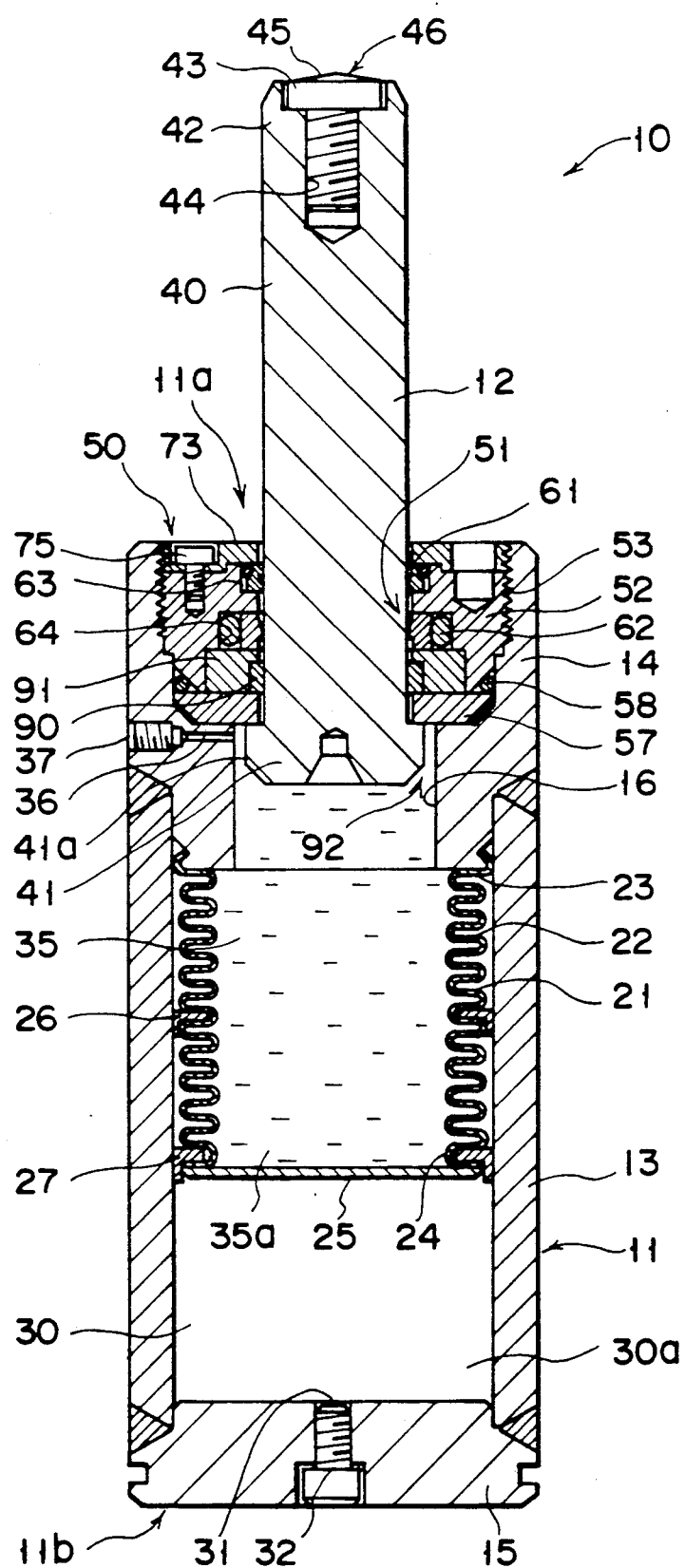
FIG. 1 is a longitudinal sectional view of a die spring apparatus according to a first embodiment of the present invention.

A die spring apparatus 10 shown in FIG. 1 comprises a hollow cylinder 11 and a rod 12 inserted in the cylinder 11. The cylinder 11, which has an open end 11a and a closed end 11b, is composed of a cylinder body 13 in the form of a right cylinder, a first end member 14 at the open end 11a, and a second end member 15 at the closed end 11b. The first end member 14 has a hole 16 through which the rod 12 is passed. The rod 12 is movable in the axial direction of the cylinder 11.

A bellows 21 is housed in the cylinder 11. The bellows 21 has a metallic bellows body 22 capable of extension and contraction in the axial direction of the cylinder 11. A fixed end 23 of the bellows body 22 is hermetically welded to the first end member 14. The other end 24 of the body 22 is hermetically closed by means of a metallic bellows cap 25. The bellows body 22 is formed of a stainless-steel sheet with a thickness of 0.1 to 0.3 mm. Alternatively, however, the body 22 may be formed of any other metal than stainless steel, and may have a thickness outside the aforesaid range.

Bellows guide members 26 and 27 are arranged on the outer peripheral surface of the bellows body 22. The members 26 and 27 are used to secure a given clearance between the body 22 and the cylinder 11, and to reduce frictional drag between the body 22 and the cylinder 11.

A gas chamber 30, which is defined by the inner surface of the cylinder 11 and the outer surface of the bellows 21, is charged with an inert gas 30a. For example, nitrogen may be used as the inert gas 30a. The charging pressure of the gas 30a is decided depending on the wrinkle restraining force required of the die spring apparatus 10. The gas pressure ranges from tens of kgf/cm$^2$ to 150 kgf/cm$^2$, for example. A gas supply port 31 formed in the second end member 15 of the cylinder 11 is closed by means of plug 32 after the gas chamber 30 is charged with the gas 30a.

A liquid chamber 35 defined by the inner surface of the bellows 21 is filled with a liquid 35a, e.g., oil. An air vent hole 36 communicating with the chamber 35 is closed by means of a plug 37. The gas and liquid chambers 30 and 35 are completely divided from each other by means of the metallic bellows 21. Despite its thinness, the bellows 21 can serve as a very effective gas barrier. Thus, the gas 30a in the gas chamber 30 can never get into the oil 35a in the liquid chamber 35.

Figure 7:
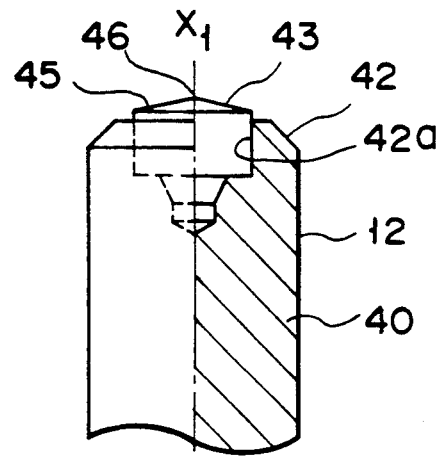
FIG. 7 is a side view, partially in section, showing a modification of the outer end of the rod.

The rod 12 has a columnar rod body 40. The rod body 40 has an inner end 41 situated in the cylinder 11 and an outer end 42 outside the cylinder. A head member 43 formed of tool steel is fixed to the outer end 42 of the rod body 40. The hardness of the member 43 is increased by heat treatment. The illustrated head member 43 is screwed in an axial tapped hole 44 which is formed in the rod body 40. An end face 45 of the head member 43 is in the form of a cone having a wide apex angle of about 160° to 170°. A load receiving portion 46 protrudes from the center of the end face 45 on the axis of the rod 12. Alternatively, the head member 43 may be press-fitted in a hole 42a of the rod 12, as shown in FIG. 7.

A sealing assembly 50 is attached to the first end member 14 of the cylinder 11. The assembly 50, which includes a seal housing 52, has a rod hole 51 through which the rod 12 is passed. The housing 52 is fixed to the first end member 14 by being screwed into a female screw 53 formed on the member 14. A stopper plate 57 is provided between the end face of the seal housing 52 and the first end member 14. The space between the member 14 and the seal housing 52 is sealed by means of an O-ring 58.

Figure 2:
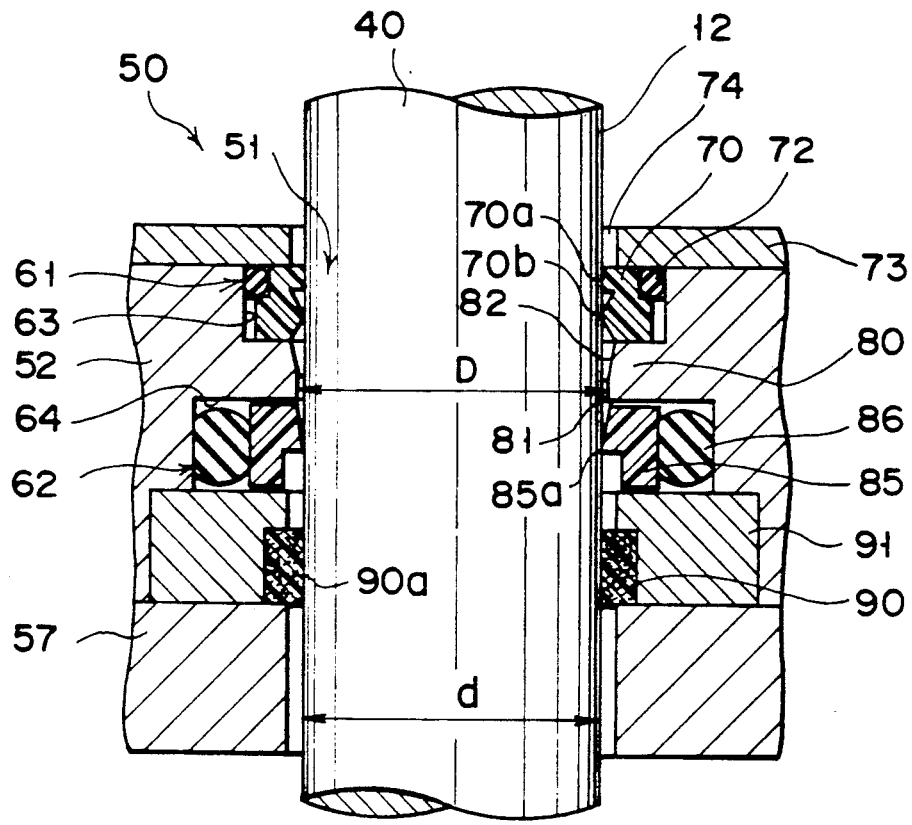
FIG. 2 is an enlarged sectional view of a sealing assembly of the die spring apparatus shown in FIG. 1.
Figure 3:
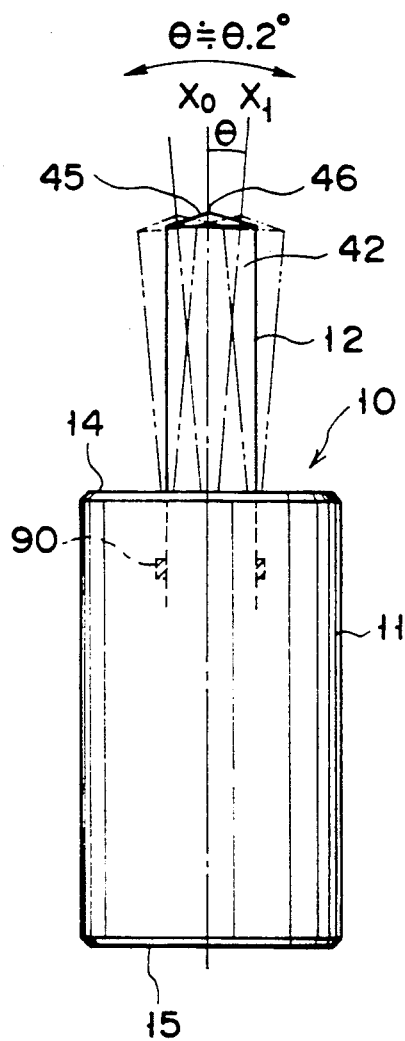
FIG. 3 is a side view showing a range within which a rod of the die spring apparatus shown in FIG. 1 can swing.

As shown in FIG. 2, first and second seal devices 61 and 62 are provided on the inner peripheral surface of the rod hole 51 of the sealing assembly 50. The seal devices 61 and 62 are housed in first and second annular grooves 63 and 64 in the seal housing 52. Each of the grooves 63 and 64 is continuous in the circumferential direction of the housing 52.

An example of the first seal device 61 includes a circular seal ring 70 formed of a synthetic resin, such as polyurethane, and an elastomer ring 72 on the outer peripheral surface of the ring 70. The elastomer ring 72, which is an O-ring formed of synthetic rubber, is pressed-fitted between the outer peripheral surface of the seal ring 70 and the inner peripheral surface of the first annular groove 63. Two projections 70a and 70b are arranged on the inner peripheral surface of the ring 70 so as to be continuous throughout the circumference. The projections 70a and 70b are intimately in contact with the outer peripheral surface of the rod 12.

A seal cover 73 holds down the respective end faces of the rings 70 and 72. A rod hole 74 is bored through the cover 73. The inside diameter of the hole 74 is greater than the outside diameter d of the rod 12 by about 1 mm to several millimeters. The seal cover 73 is fixed to the seal housing 52 by means of a screw 75.

An intermediate wall 80 is located between the first and second annular grooves 63 and 64. The inside diameter D of a rod hole 81 bored through the wall 80 is greater than the outside diameter d of the rod 12 by about 0.2 mm to 0.8 mm (preferably, 0.4 mm to 0.6 mm). Also, an inner peripheral surface 82 of the hole 81 is tapered so that the inside diameter of the hole decreases with distance from the first annular groove 63. Since the surface 82 is thus tapered, a swing angle $\theta$ (mentioned later) of the rod 12 can be widened.

An example of the second seal device 62 includes a seal ring 85 formed of a synthetic resin and an elastomer ring 86. The elastomer ring 86 is pressed-fitted between the outer peripheral surface of the seal ring 85 and the inner peripheral surface of the second annular groove 64. The inner peripheral surface of the ring 85 is intimately in contact with the rod 12 at a projection 85a thereon which is continuous throughout the circumference of the ring 85. Polytetrafluoroethylene resin mixed with graphite is a recommendable example of a low-friction resin which may be used as a material of the seal ring 85. The material may alternatively be any other suitable resin or a metal coated with a low-friction resin.

A sleeve-shaped bearing member 90 is retained on the inner periphery side of a bearing holder 91. The holder 91 is held between the seal housing 52 and the stopper plate 57. The bearing member 90 may be formed, for example, of polyfluoroethylene resin mixed with a web 90a. Alternatively, however, the member 90 may be formed of any other fiber-reinforced synthetic resin or a metallic ring body whose inner surface is coated with a low-friction resin. The bearing member 90 is provided at only one portion of the sealing assembly 50 with respect to the axial direction thereof. In other words, the rod 12 is restrained from moving in the radial direction by the single bearing member 90.

The inner end 41 of the rod 12 is flange-shaped. The outside diameter of the inner end 41 is greater than that of the rod body 40. When the rod 12 moves for a given stroke in a direction such that it projects from the cylinder 11, the flange-shaped inner end 41 abuts against the stopper plate 57, whereby the stroke end of the rod 12 is defined. An example of the stroke of the rod 12 is 100 mm.

A space 92 is defined between an outer peripheral surface 41a of the inner end 41 of the rod 12 and the inner peripheral surface of the cylinder 11 so as to be continuous throughout the circumference of the end 41. In the seal devices 61 and 62, moreover, the elastomer rings 72 and 86 are provided on the outer peripheral surface side of the seal rings 70 and 85, respectively. Accordingly, the devices 61 and 62 can be elastically deformed by a load acting in the radial direction of the rod 12. Thus, the rod 12 can swing within an angular range of $\theta$ around the bearing member 90 on each side of the axis XO of the cylinder 11, as indicated by two-dot chain lines in FIG. 3 or 5. An example of the angle $\theta$ is about 0.2°.

Figure 4:
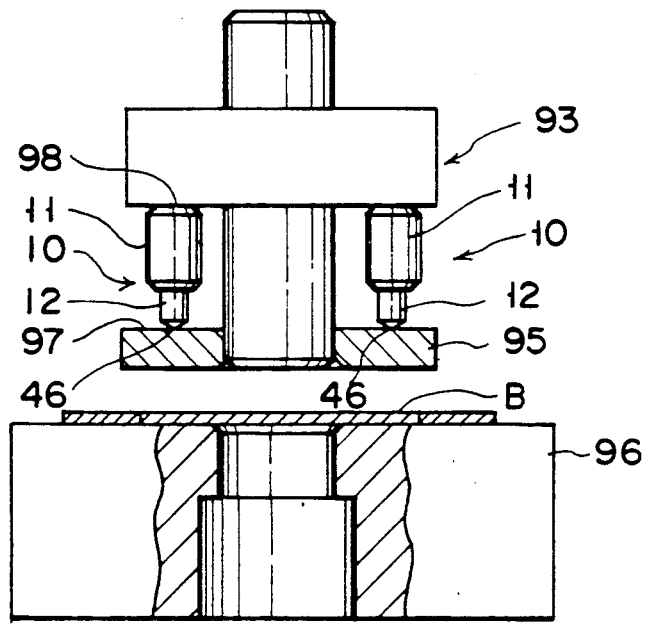
FIG. 4 is a side view of press equipment, partially in section, showing an operation mode of the die spring apparatus shown in FIG. 1.

FIG. 4 shows an example of an operation mode of the die spring apparatus 10. The illustrated apparatus 10 is mounted on a first die unit 93. A pressure pad 95 is attached to the lower portion of the unit 93. A blank B is set on a second die unit 96. A load receiving portion 46 of the die spring apparatus 10 is in contact with a bearing portion 97 of the first die unit 93. The cylinder 11 is supported on the portion 98.

Figure 5:
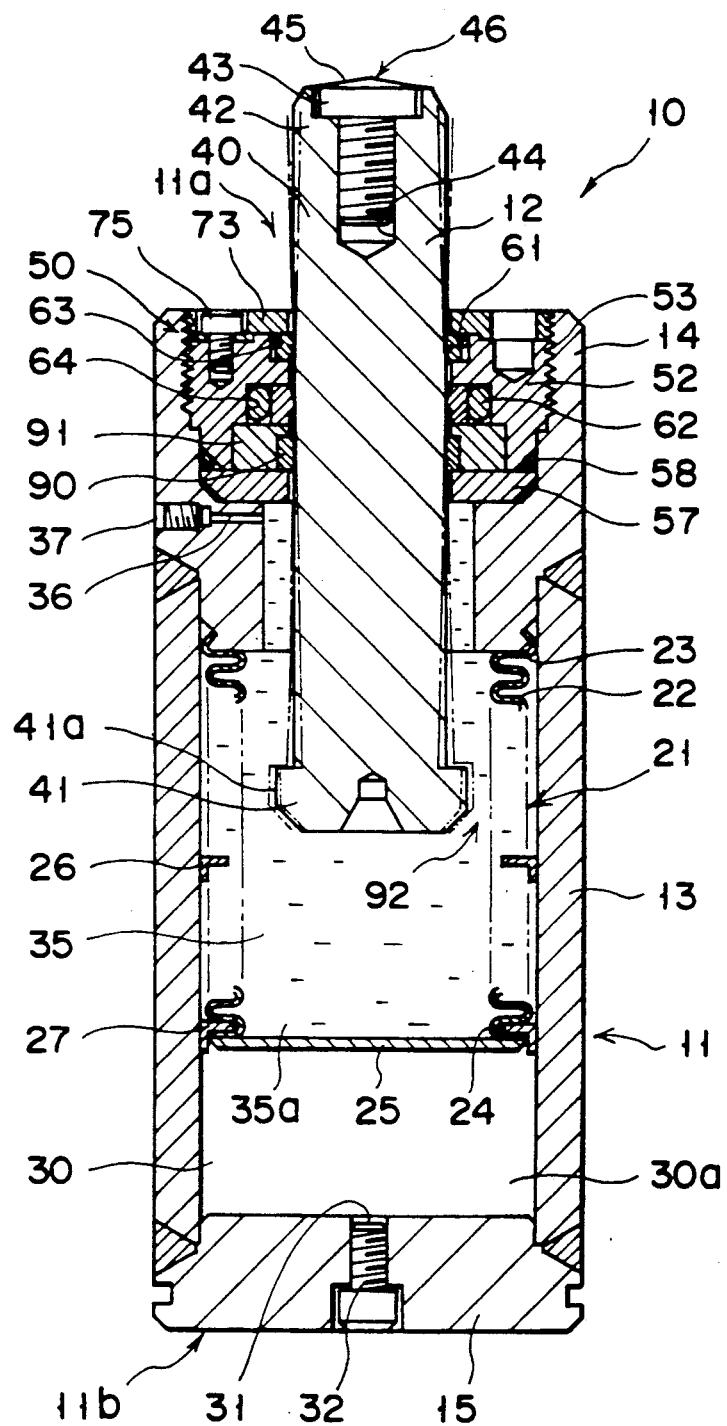
FIG. 5 is a sectional view showing a state in which the rod of the die spring apparatus shown in FIG. 1 is in the cylinder.

When the die unit 93 lowers for pressing, the rod 12 moves in a direction such that it is forced into the cylinder 11. Thereupon, the depth of insertion of the rod 12 in the cylinder 11 increases, as shown in FIG. 5. Thus, the gas chamber 30 is further compressed and its capacity decreases in proportion to the depression of the rod 12. As the capacity of the chamber 30 decreases in this manner, the bellows 21 extends, and the pressure in the chamber 30 increases. The pressure of the gas 30a in the gas chamber 30 is transmitted to the oil 35a in the liquid chamber 35, and also acts so as to push out the rod 12 from the cylinder 11. Accordingly, the pressure pad 95 presses the edge portion of the blank B, thereby preventing the blank B from wrinkling during the pressing operation.

When the die unit 93 is driven in an opening direction after the pressing operation, the rod 12 moves in the direction to project from the cylinder 11. If the rod 12 moves in this direction, then the capacity of the gas chamber 30 increases in proportion to the movement of the rod 12, so that the bellows 21 is restored to its original state.

Figure 6:
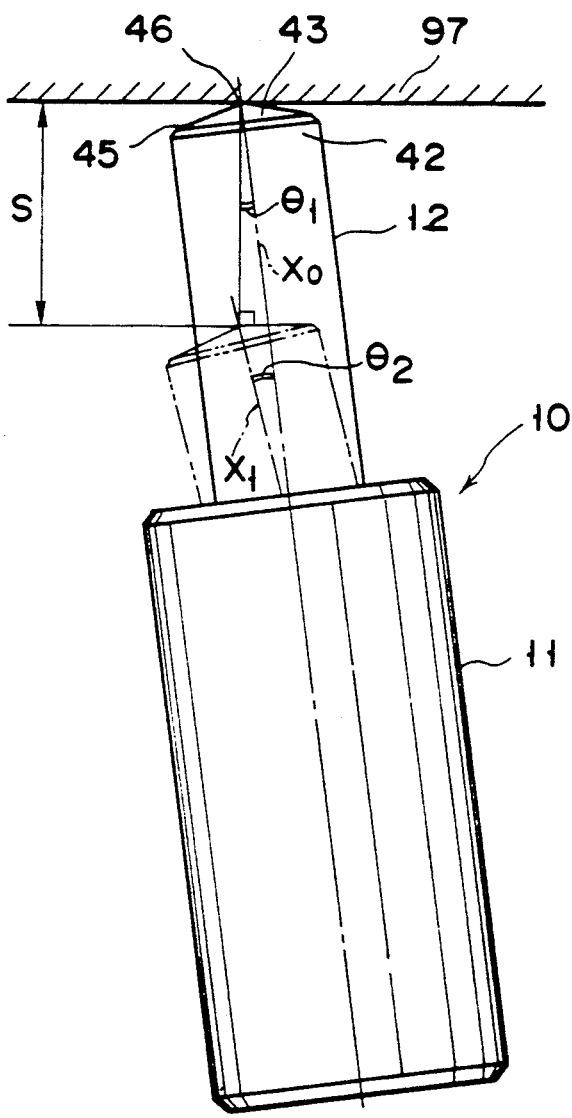
FIG. 6 is a side view showing a state in which the die spring apparatus shown in FIG. 1 is tilted.

Since the load receiving portion 46 is in contact with the bearing portion 97, the load acts on the axis X0 of the die spring apparatus 10 even if the axis X0 is inclined with respect to the portion 97, as shown in FIG. 6. In this state, when the bearing portion 97 lowers for a stroke S, thereby causing the rod 12 to be forced into the cylinder 11, the load receiving portion 46 lowers straight in the same direction as the portion 97. Accordingly, the axis X1 of the rod 12 swings at an angle $\theta 2$ to the axis X0 of the cylinder 11 around the bearing member 90. Namely, even if the rod 12 shifts for the stroke S, the load receiving portion 46 never shifts transverse to the bearing portion 97. Therefore, no frictional drag is produced between the portions 46 and 97, and the rod 12 is not subjected to any excessive load in the radial direction. Thus, the bearing member 90 and the holder 91 can be prevented from being subjected to an undue radial load.

Figure 8:
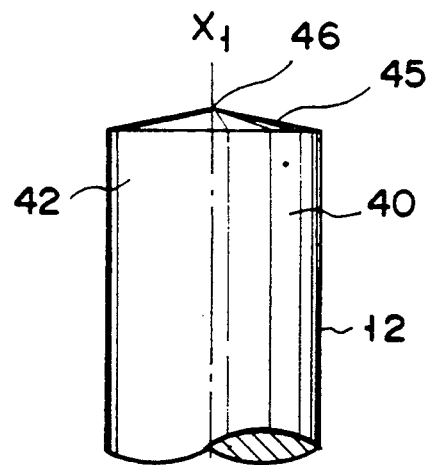
FIG. 8 is a side view showing another modification of the outer end of the rod.

As shown in FIG. 7, the head member 43 may alternatively be press-fitted in the hole 42a at the outer end 42 of the rod 12. As shown in FIG. 8, moreover, the outer end 42 of the rod body 40 may be made conical in shape. In any case, the load receiving portion 46 is expected to project onto the axis X1 of the rod 12.

Figure 9:
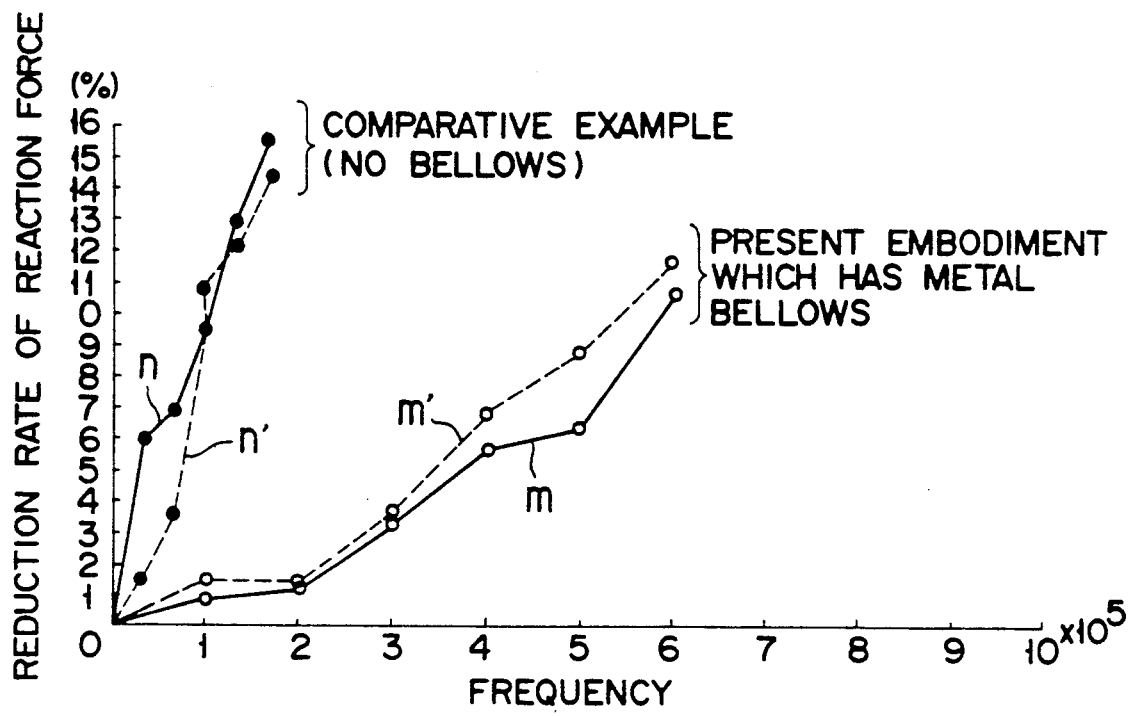
FIG. 9 is a diagram showing reduction rates of reaction force of the die spring apparatus shown in FIG. 1 compared with those of a die spring apparatus having no bellows therein.

FIG. 9 shows the results of a test for the reduction rate of reaction force of the apparatus 10 of the present embodiment, which has the metallic bellows built-in, compared with that of an apparatus (not shown) as a comparative example which has no bellows therein. Here the reaction force is a force to push out the rod 12 from the cylinder 11. If the reaction forces before and after the test are P1 and P2, respectively, the reduction rate of reaction force is given by $(P1-P2)/P1 \times 100\%$.

In both the apparatus 10 of the present embodiment and the apparatus for comparison, the stroke of the rod 12 is 100 mm, and the gas pressure is 141 kgf/cm$^2$ (35° C.). Each apparatus uses only one bearing member 90 for supporting the radial load.

These two apparatuses of different types were mounted between the bearing portions 97 and 98 so that the axis X0 was tilted at an angle $\theta$1 of 0.17°, and an endurance test was conducted in a dust atmosphere with the stroke of 95 mm and frequency of 0.75 Hz. In FIG. 9, the test results represented by full-line curves m and n indicate reduction rates of reaction force as measured with the rod undepressed (initial reaction force). The test results represented by broken-line curves m' and n' indicate reduction rates of reaction force as measured with the rod compressed for 95 mm. Thus, it was proved that the apparatus 10 of the present embodiment is lower in the reduction rate of reaction force and higher in durability than the apparatus for comparison.

The test results suggest that some of the gas in the apparatus for comparison, which has no metallic bellows 21 therein, probably leaked out through the sealing assembly.

The liquid 35a in the liquid chamber 35 of the apparatus 10 of the present embodiment is higher in both viscosity and intermolecular density than the gas 30a. Therefore, the chamber 35 can be securely sealed by means of the rings 70, 85 and 90 of the sealing assembly 50. Since the liquid 35a in the chamber 35 is thus sealed by means of the sealing assembly 50, the gas 30a in the gas chamber 30 can be prevented from leaking out from the cylinder 11.

Figure 10:
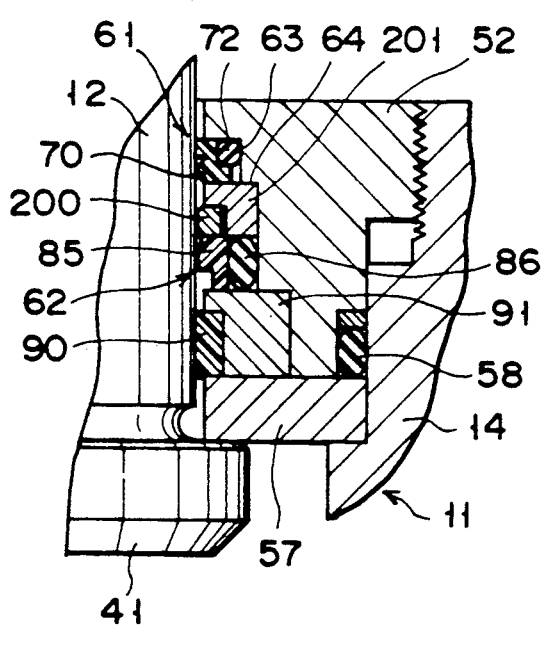
FIG. 10 is a partial sectional view of a sealing assembly in a die spring apparatus according to a second embodiment of the present invention.

FIG. 10 shows a sealing assembly of a die spring apparatus according to a second embodiment of the present invention. In this embodiment, a backup spring 200 formed of bronze or some other metal is interposed between the respective seal rings 70 and 85 of the first and second seal devices 61 and 62. The ring 200 may alternatively be formed of a resin containing bronze or brass.

The backup ring 200, which is retained by means of a retainer 201, serves to prevent the seal ring 85 from being dragged by the rod 12 when the rod moves in the direction to project from the cylinder 11.

The stopper plate 57 and the bearing holder 91 may alternatively be formed as one integral unit.

Figure 11:
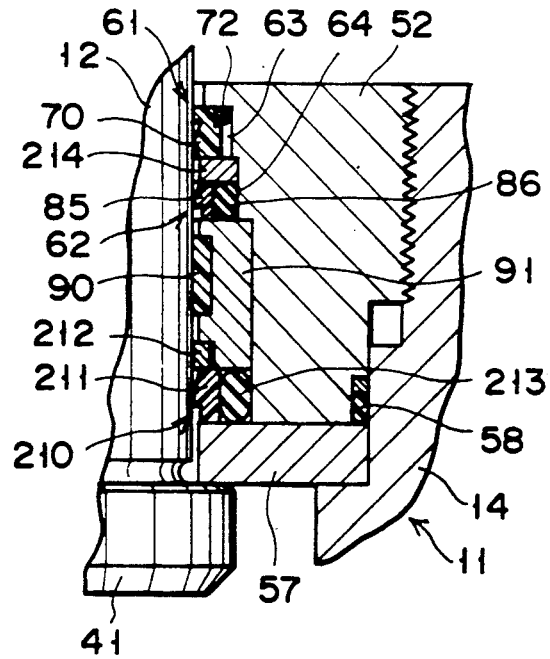
FIG. 11 is a partial sectional view of a sealing assembly in a die spring apparatus according to a third embodiment of the present invention.
Figure 12:
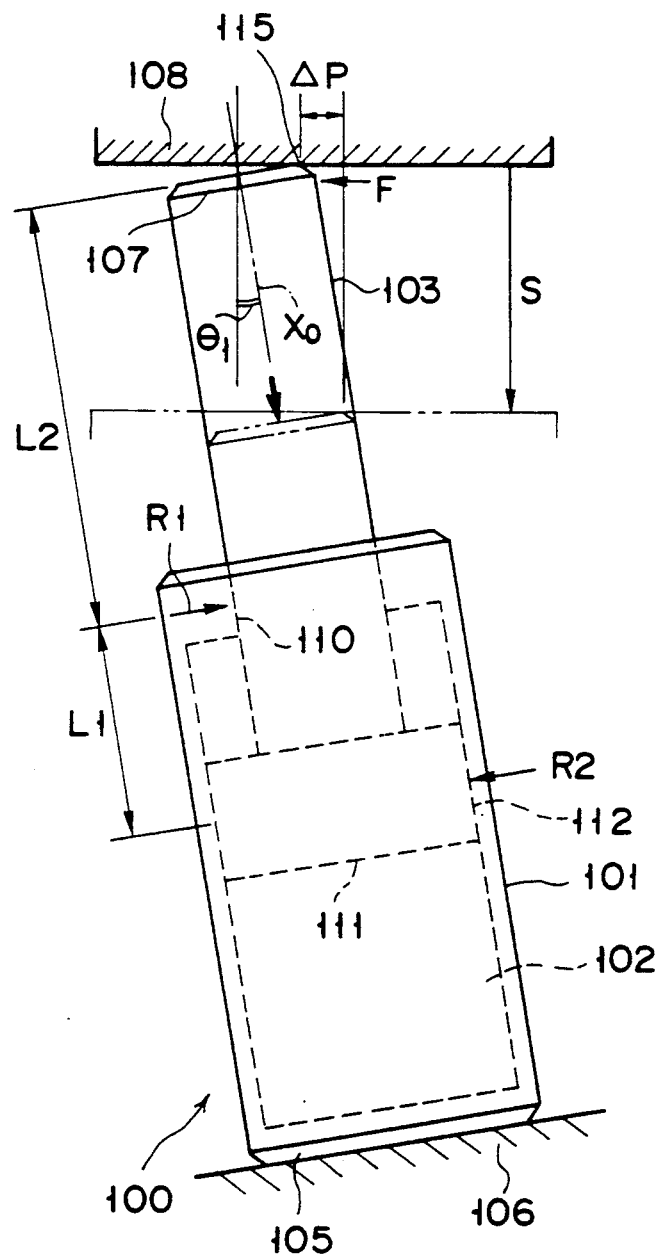
FIG. 12 is a side view showing a prior art die spring apparatus mounted in a tilted state.

In a sealing assembly of a die spring apparatus according to a third embodiment of the present invention shown in FIG. 11, a third seal device 210 is disposed between the bearing member 90 and the stopper plate 57. The device 210 is composed of a seal ring 211 in contact with the rod 12, a backup ring 212, and an elastomer ring 213 press-fitted on the outer peripheral side of the seal ring 211. Constructed in this manner, the seal device 210, like the first and second seal devices 61 and 62, can be elastically deformed in the radial direction of the rod 12. Thus, the rod 12 can swing within the aforesaid angular range of 8 around the bearing member 90. A spacer ring 214 is interposed between the respective seal rings 70 and 85 of the first and second seal devices 61 and 62.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A die spring apparatus comprising:

a cylinder having an open end and a closed end, said cylinder having an inner peripheral surface;

partitioning means housed in the cylinder and defining a liquids chamber situated on the side of the open end and a gas chamber situated on the side of the closed end;

a liquid contained in the liquid chamber;

a compressed gas with which the gas chamber is charged;

a rod which has an outer peripheral surface, inserted into the cylinder through the open end thereof so as to be movable relatively to the cylinder in the axial direction, said rod having an inner end which has an outer peripheral surface situated in the cylinder and an outer end situated outside the cylinder.

a space extending throughout the circumference between the outer peripheral surface of the inner end of the rod and the inner peripheral surface of the cylinder; and a sealing assembly provided near the open end of the cylinder and having a rod hole through which the rod is passed, said sealing assembly including:
(a) sealing housing fixed to the cylinder and having an inner peripheral portion facing the outer peripheral surface of the rod, said inner peripheral portion having a first annular groove which has an inner peripheral surface and a second annular groove which has an inner peripheral surface and is located closer to said liquid chamber than said first groove;
(b) a single bearing member which has outer and inner peripheral surfaces, is formed of synthetic resin, is positioned at only one portion of the sealing assembly, and is adapted for restraining radial motion of the rod, said single bearing member being located closer to said liquid chamber than said second groove, said inner peripheral surface of said bearing member being in contact with the outer peripheral surface of the rod;
(c) a bearing holder for supporting the outer peripheral surface of said bearing member, said bearing holder being inserted into said inner peripheral portion of said seal housing;
(d) a first seal device, housed in said first annular groove of the seal housing, and including a first seal ring which has outer and inner peripheral surfaces and a first elastomer ring, said inner peripheral surface of the seal ring being in close contact with the outer peripheral surface of the rod, said first elastomer ring being press-fitted between the outer peripheral surface of said first seal ring and the inner peripheral surface of said first groove; and
(e) a second seal device adapted for preventing leakage of the liquid in the liquid chamber, said second seal device having a second seal ring which has outer and inner peripheral surfaces and a second elastomer ring, said second seal ring being housed in the second annular groove of the seal housing, said inner peripheral surface of said second seal ring being in close contact with the outer peripheral surface of the rod, said second elastomer ring being press-fitted between the outer peripheral surface of said second seal ring and the inner peripheral surface of said second groove.

2. The die spring apparatus according to claim 1, wherein each of said first and second seal rings is formed of polyfluoroethylene mixed with graphite.

3. The die spring apparatus according to claim 1, wherein each of said first and second elastomer rings is an O-ring formed of synthetic rubber.

4. The die spring apparatus according to claim 1, wherein said partitioning means is a metallic bellows capable of extension and contraction in the axial direction of the cylinder, and said gas camber and said liquid chamber are defined by the outer and inner surfaces, respectively, of the metallic bellows, and said inner end of said rod moves into the inside of said bellows while said rod is being pushed into the cylinder.

* * * * *